Sept. 16, 1924.
H. N. McGAUGHEY
WINDOW
Filed July 17, 1923
1,509,052
Fig.1. Fig.3.
Fig.2.
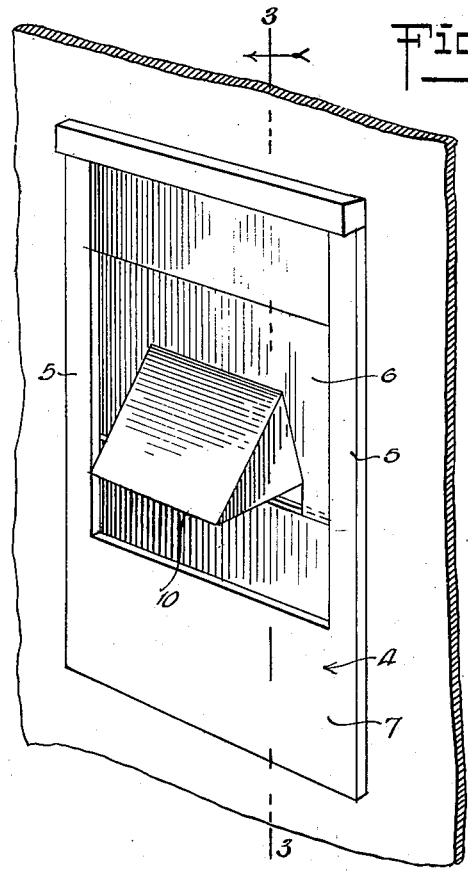
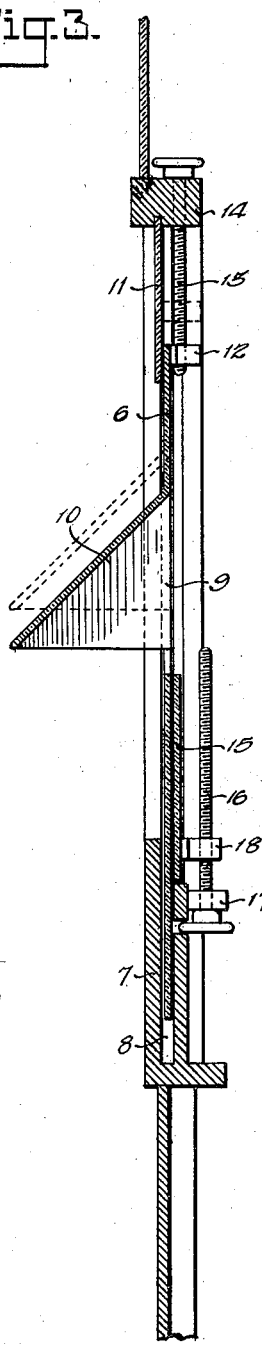
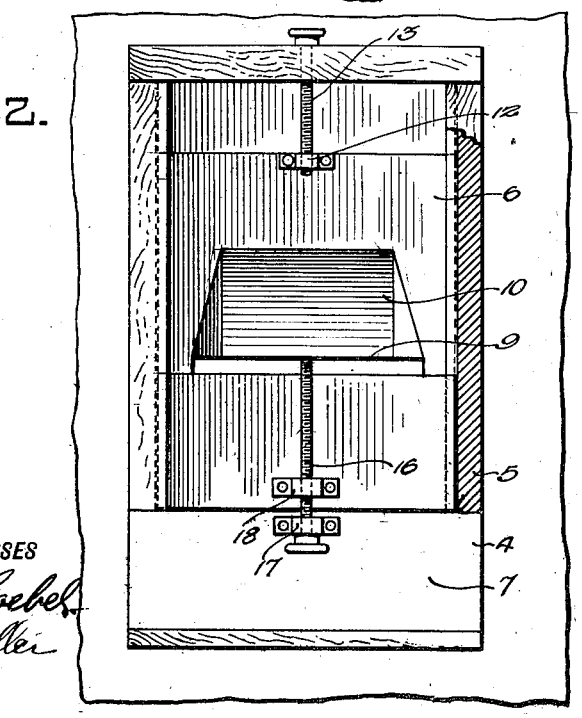
WITNESSES
INVENTOR
H.N. McGAUGHEY
BY
ATTORNEYS Patented Sept. 16, 1924.

1,509,052

UNITED STATES PATENT OFFICE.

HENRY N. McGAUGHEY, OF NETTLETON, MISSISSIPPI.

WINDOW.

Application filed July 17, 1923. Serial No. 652,135.

*To all whom it may concern:*

Be it known that I, HENRY N. McGAUGHEY, a citizen of the United States, and a resident of Nettleton, in the county of Lee and State of Mississippi, have invented a new and Improved Window, of which the following is a full, clear, and exact description.

This invention relates to improvements in windows and has particular reference to a window for use in locomotive or street car cabs and other vehicles.

An object of the present invention is to provide an improved window of simple construction which will permit of the driver of a vehicle obtaining a clear and unobstructed vision through an opening in the window and which, at the same time, will prevent rain or snow from passing through said opening.

Another object is to provide a window sections of which are adjustable relative to the window frame and to each other to permit of varying the range of vision through the window and regulating the size of an opening therein.

The above and other objects will appear more clearly from the following detail description, when taken in connection with the accompanying drawing, which illustrates a preferred embodiment of the inventive idea.

In the drawing—

Figure 1 is a perspective view constructed in accordance with the invention;

Figure 2 is an interior elevational view, partly broken away and shown in section; and Figure 3 is a vertical sectional view on the line 3—3 of Figure 1.

Referring more particularly to the accompanying drawing the numeral 4 indicates generally a window frame, the side members 5 of which are grooved to receive the vertical edges of a section 6 made of transparent material, such as glass. The lower section 7 of the frame 4 is provided therein with a groove or channel 8 for receiving the lower portion of the section 6. Intermediate the top and bottom of the section 6 the same is provided with an opening 9 which is partially closed by an overhanging hood 10 extending outwardly from the section and providing an opening through which the driver of a vehicle may have a clear vision should the outer surface of the section be covered by rain or snow. At the upper end of the window frame the stationary section or panel 11 is mounted and with respect to which the section 10 is vertically adjustable. In order that the adjustment of the section 6 may be accomplished the upper edge thereof is provided with a lug 12 projecting inwardly from the section and provided therein with an opening for receiving the threads of an adjusting screw 13 which extends upwardly from the section and through the upper rail 14 of the window frame so that by turning the adjusting screw the section 6 may be raised or lowered to vary the height of the hood 10 and consequently the range of vision of the driver of the vehicle.

Extending parallel with the grooves in the side members 5 in which the section 6 is slidably mounted and arranged inwardly of said grooves are other grooves in said side members for receiving the vertical edges of an inner section 15 also made of glass or other transparent material. The section 15 is adjustable vertically in the grooves in which it is mounted and with respect to the section 6 by means of a screw member 16 supported in the lug 17 carried by the lower portion of the window frame and engageable in a threaded opening formed in the lug 18 carried by the section 15. Thus by turning the screw member 16 it will be obvious that the section 15 may be raised and lowered in the frame to vary the size of the opening 9 formed in the section 6. In case of cold weather the section 15 may be raised to diminish the size of the opening 9 or completely close the same by turning the screw member 15 in one direction.

What is claimed is:

In a window, a frame forming a window opening and including a lower section having a channel therein, a stationary panel at the upper end of said frame forming a partial closure for said opening, a section forming a part of the window slidably engageable with said panel and also engageable in said channel, said window section having an opening and an overhanging hood for said opening, a screw member supported in said frame on the inner side of said stationary panel and connected to said window section to vertically adjust the same, a second window section supported at the lower end of said frame and movable vertically thereon and with respect to the first-named window section to regulate the size of the opening in said first-named window section, and a second screw member carried by the lower section of said frame and connected to said second-named window section to adjust the same.

HENRY N. McGAUGHEY.